US012336067B2

(12) United States Patent
Bergenek et al.

(10) Patent No.: US 12,336,067 B2
(45) Date of Patent: Jun. 17, 2025

(54) LIGHT ENGINE, DRIVER, AND SYSTEM INCLUDING THE LIGHT ENGINE AND DRIVER

(71) Applicant: LEDVANCE GmbH, Garching bei Munchen (DE)

(72) Inventors: Krister Bergenek, Regensburg (DE); Alexander Niggebaum, Munich (DE); Philipp Klier, Munich (DE)

(73) Assignee: LEDVANCE GMBH, Garching bei Munchen (DE)

(*) Notice: Subject to any disclaimer, the term of this patent is extended or adjusted under 35 U.S.C. 154(b) by 374 days.

(21) Appl. No.: 17/724,541

(22) Filed: Apr. 20, 2022

(65) Prior Publication Data

US 2022/0346202 A1 Oct. 27, 2022

(30) Foreign Application Priority Data

Apr. 22, 2021 (DE) ........................ 102021110261.8

(51) Int. Cl.

*H05B 45/22* (2020.01)
*H05B 45/28* (2020.01)
*H05B 45/30* (2020.01)
*H05B 47/11* (2020.01)

(52) U.S. Cl.

CPC ............. *H05B 45/22* (2020.01); *H05B 45/28* (2020.01); *H05B 45/30* (2020.01); *H05B 47/11* (2020.01)

(58) Field of Classification Search

CPC ........ H05B 45/22; H05B 45/28; H05B 45/30; H05B 47/105; H05B 47/11; H05B 45/10; H05B 45/12; H05B 45/18; H05B 45/20; H05B 45/3725; H05B 47/155; H05B 47/165; F21V 23/004; F21V 23/005; F21Y 2115/10; F21Y 2103/10

See application file for complete search history.

(56) References Cited

U.S. PATENT DOCUMENTS 8,454,195 B2 * 6/2013 Ing ........................ F21V 23/004 362/249.01
10,609,797 B1 * 3/2020 Jonsson ................. H05B 45/14
11,499,703 B1 * 11/2022 Smith ................... F21V 23/004

(Continued)

FOREIGN PATENT DOCUMENTS

DE 202004006292 U1 7/2004
DE 102010031242 A1 9/2011

(Continued)

*Primary Examiner* — Daniel D Chang
(74) *Attorney, Agent, or Firm* — Hayes Soloway PC

(57) ABSTRACT

A light engine with a driver interface is provided. The light engine is configured to be driven by a driver via the driver interface. The light engine comprises an LED circuit, wherein the LED circuit comprises a number of LED stands each comprising a number of LEDs. The light engine further comprises a control unit comprising a memory unit for storing a maximum allowable current value for the light engine, and a digital interface for receiving and/or sending data, wherein the control unit is configured to output the maximum allowable current value stored in the memory unit via the digital interface for configuring the driver so that the electric current provided by the driver does not exceed the maximum allowable current value of the light engine. A driver and a system are further specified.

20 Claims, 2 Drawing Sheets

(56) References Cited

U.S. PATENT DOCUMENTS

| | | | | |
|---|---|---|---|---|
| 2012/0200229 | A1* | 8/2012 | Kunst | H05B 45/385 315/186 |
| 2013/0328493 | A1* | 12/2013 | Munday | H05B 45/375 315/201 |
| 2018/0295689 | A1 | 10/2018 | Bandel | |
| 2020/0103705 | A1* | 4/2020 | Chen | H05B 45/32 |

FOREIGN PATENT DOCUMENTS

| | | | |
|---|---|---|---|
| DE | 102014226788 | A1 | 6/2016 |
| DE | 102017119999 | A1 | 2/2019 |
| WO | 2021018984 | A1 | 2/2021 |

* cited by examiner

LIGHT ENGINE, DRIVER, AND SYSTEM INCLUDING THE LIGHT ENGINE AND DRIVER

CROSS-REFERENCE TO RELATED APPLICATIONS

This patent application claims priority from German Patent Application No. 102021110261.8, filed Apr. 22, 2021, which is hereby incorporated by reference in its entirety.

FIELD OF THE DISCLOSURE

The invention relates generally to a light engine. More specifically, the invention relates to a light engine, a driver, and a system comprising the light engine and the driver.

BACKGROUND

Light sources are known that are designed to produce light when driven by a driver or source of electrical energy. LED light engines are also known, which have LEDs as illuminants and are designed to be driven by an LED driver as a power source.

Light engines for lighting devices or lighting systems with adjustable spectral properties are also known, which have two or more LED strands and can be controlled independently of each other by two or more drivers or via two or more output channels of a driver.

Due to the constant development of new product variants, the light engines and drivers are constantly being recombined. When putting together a driver-light engine combination, factors such as the required voltages and maximum permissible currents must be taken into account in addition to the number of output channels of the driver or the number of LED strands of the light engine. If a light engine or lighting device is designed for a certain maximum current, for example, a driver with a suitable maximum current or with a suitably set maximum current must also be selected. A plurality large number of light engines and drivers must therefore be kept in stock for different product variants, which poses a production-related, logistical, and ecological problem, especially with regard to the Single Lighting Regulation of the European Union (Directive (EU) No. 2019/2020). This is because the interchangeability of individual components is not always readily possible, for example, due to incompatibility of light engines and drivers.

SUMMARY

One object of the present invention is to provide a light engine that can be combined with a driver in a simple and flexible manner.

According to a first aspect, a light engine with a driver interface is provided to solve this object. The light engine is designed to be driven by a driver via the driver interface. The light engine comprises an LED circuit, wherein the LED circuit comprises a number of LED strands each comprising a number of LEDs. The number of LED strands of the light engine as well as the number of LEDs within one of the LED strands may in principle be any natural number. In particular, the LED circuit may be mounted on one or more printed circuit boards.

The light engine has a control unit or logic unit with a memory unit for storing a maximum permissible current value for the light engine, and a digital interface, in particular for receiving and sending data or signals or messages. The control unit is designed to output the maximum permissible current value stored in the memory unit via the digital interface for configuring the driver so that the electric current provided by the driver does not exceed the maximum permissible current value of the light engine.

The memory unit can be designed in such a way that the content is static or dynamic. Static content can, for example, be set at the time of production of the light engine and cannot be changed thereafter. It can also be independent of whether the system is powered or not. A dynamic content can be provided by the control unit on the light engine based on measurements and change depending on the situation. In the latter case, this may mean that the content needs to be recreated after the system is disconnected from the mains. This may also mean that the driver has to communicate with the light engine before it is possible to provide an output power.

Furthermore, the memory unit can be designed to act as a communication buffer between the interface on the driver and the interface on the light engine, so that the information to be transmitted is converted to the communication protocol.

The digital interface of the light engine can in particular be designed to be operated in an intra-luminaire network or within a luminaire network as part of a light management system (LMS) and/or to be directly addressed by the driver so that general and/or specific operating parameters of the light engine or lighting device can be retrieved or set.

In particular, the maximum permissible current value output by the digital interface of the light engine can be passed on to a control unit of the driver, in particular via a digital interface of the driver, for automatic configuration of the driver. The control unit of the driver can configure the driver based on the maximum permissible current in such a way that the electrical current output by the driver does not exceed the maximum permissible current value of the light engine.

Thus, an intelligent LE is provided, which is able to cause the driver to limit the output current. By configuring the driver according to the maximum current allowed by the light engine, the driver can be used without having to make manual or semi-automatic adjustments to the driver, especially via DIP (Dual Inline Package) switches, jumpers, resistors, programming via NFC (Near Field Communication) or DALI (Digital Addressable Lighting Interface) interface.

Accordingly, the selection of the driver according to maximum current or the manual setting of the maximum current can be dispensed with, as this information can now be obtained automatically from the light engine. Drivers and light engines can thus be easily combined or mutually exchanged without fear of damage to the light engine. The easy exchangeability of the light engine and driver also reduces the environmental impact and supports the circular economy.

The LED circuit may have two or more LED strands and the light engine may have a power distribution unit to control the distribution of the power provided by the driver to the LED strands. By means of the power distribution unit, the LED strands can be addressed or controlled individually without having to provide a dedicated output channel of the driver for each LED strand. The light engine thus takes over the differentiated control of different LED strands, eliminating the need for a multi-channel driver to drive a light engine with two or more LED strands that can be controlled separately from each other, for example to adjust the light colour or colour temperature, as with so-called tunable white light engines. Lighting systems with drivers and light engines can thus be simplified considerably, as lighting systems with controllable light parameters can already be realised with a single-channel driver.

The memory unit may further be designed to store calibration data of the LEDs or the LED strands, and the control unit may be designed to control the power distribution unit in such a way that the distribution of the power provided by the driver to the LED strands is at least partly based on the calibration data of the LEDs. Since the light engine itself contains the calibration data and performs the setting of the channels or the power distribution to the LED strands, the light colour and/or colour temperature can be controlled via the light engine itself, so that the factory calibration of the LEDs or the drivers can be dispensed with.

For example, the light engine or the control unit of the light engine can receive a command via the digital interface or via the driver interface to set, adjust and/or gradually change the colour temperature, in particular over a period of time, and the light engine can use the power distribution unit to control the power distribution between the LED strands accordingly itself or independently.

The light engine may comprise a sensor system with a number of sensors for providing at least one sensor signal, and the control unit may be designed to control the LED strands at least partially based on the at least one sensor signal detected by the sensor system. The light engine is thus able to detect and process sensor signals in order to control the LED strands independently (i.e., without inputs from the driver or from external controllers), taking into account the sensor signals, which can simplify the overall system.

The sensor system can in particular comprise a number of operating sensors for detecting one or more current operating parameters of the light engine and/or a number of environmental sensors for detecting one or more current environmental parameters. With the aid of the operating sensors and/or environmental sensors, the light engine can be controlled taking into account the current operating parameters and/or the current environmental parameters. For example, the sensor system can comprise one or more colour sensors for detecting a current light colour or colour temperature of the light generated by the light engine, in particular in order to be able to carry out a colour correction or correction of the colour temperature of the light generated by the light engine, if necessary. As an environmental sensor, the sensor system can have one or more motion or presence sensors, environmental light sensors and/or air quality sensors.

In particular, the sensor system can comprise a temperature sensor for detecting a current temperature of the light engine and the control unit can be designed to determine the maximum permissible current value on the basis of the current temperature and to store it in the memory unit or, if necessary, to update the maximum permissible current value stored in the memory unit. For example, the maximum permissible current value can be reduced if the temperature of the light engine is too high. The value for the maximum permissible current transmitted by the light engine to the driver as well as the maximum output current of the driver can thus be dynamically adjusted depending on the current temperature of the light engine.

In some embodiments, the light engine comprises a power supply unit for autonomous power supply of the control unit. The control unit can thus be supplied with power in particular even when the LED channels are deactivated or when the light engine is not driven by the driver. In particular, the autonomous power supply of the control unit enables data to be read out from the memory unit even in the event that the light engine, the driver and/or the electrical connection between the light engine and the driver is defective.

In some embodiments, the LED circuit has several LEDs of different types distributed on two or more circuit boards, wherein only LEDs of one type are on one circuit board. Such a grouping of LEDs on different circuit boards allows for easy interchangeability of LEDs of one type with LEDs of another type, for example to adjust or change the colour temperature of the light engine.

According to a second aspect, a driver for driving a light engine according to the first aspect is provided. In particular, the driver may comprise a light engine interface to which the light engine may be connected.

The driver comprises a driver circuit for providing a current for driving the light engine, a control unit as well as a digital interface for receiving and/or sending data, wherein the control unit is designed to read a maximum permissible current value for the light engine received at the digital interface and to drive the driver circuit at least partially based on the maximum permissible current value in such a way that the electric current provided by the driver does not exceed the maximum permissible current value of the light engine.

The control unit of the driver can be designed to request the information about the maximum permissible current from the light engine at the start of the system and/or during a commissioning phase or to receive it from the light engine or a control unit in the system.

In particular, the control unit can comprise a memory unit for storing the maximum permissible current value and be designed to store the received maximum permissible current value in the memory unit in order to read it out at a later time and/or repeatedly, if necessary, until no further maximum permissible current value has been received. Due to the configuration of the driver according to the maximum permissible current, the need for a manual or semi-automatic setting of the maximum current of the driver is also eliminated. The light intensity of the light generated by the light engine can be done via the driver, in particular by controlling the output current. Due to the determination of the maximum current of the driver, it can be ensured that the maximum permissible current for the light engine is not exceeded. Thus, an intelligent driver is provided which is able to limit the output current according to the maximum permissible current of the LE.

The control unit may be configured to drive driver circuitry such that the rate of change of the output current does not exceed a predefined value. In particular, the driver can be configured to throttle the rate of change of the output current in such a way that any overshoot in the setting of the maximum output current cannot cause the light engine to exceed the maximum allowable current.

According to a third aspect, a system, in particular a lighting system, is provided. The system comprises a light engine according to the first aspect and a driver according to the second aspect, wherein the driver interface of the light engine is electrically connected to the light engine interface of the driver, and wherein there is communication, in particular via a communication bus, between the digital interface of the light engine and the digital interface of the driver.

Via the communication between the digital interfaces of the light engine and the driver, the maximum permissible current value stored in the memory unit of the light engine can be transferred to the control unit of the driver, so that the driver can be configured according to the maximum permissible current value without having to make manual or semi-automatic settings.

The system can also include a controller or central control unit that communicates with the digital interface of the light engine and with the digital interface of the driver, especially via a communication bus. With the controller or the central control unit, complex light management systems can be realised, with which various control scenarios can be played.

The system may further comprise at least one further system element which is in communication, in particular via a communication bus, with the controller. In particular, the at least one further system element may comprise one or more interface elements and/or communication modules. By connecting further system elements to the controller, the system can be easily expanded into a more complex LMS.

The invention is now explained in more detail with the aid of the attached figures. The same reference signs are used in the figures for identical or similarly acting parts.

DETAILED DESCRIPTION

Figure 1:
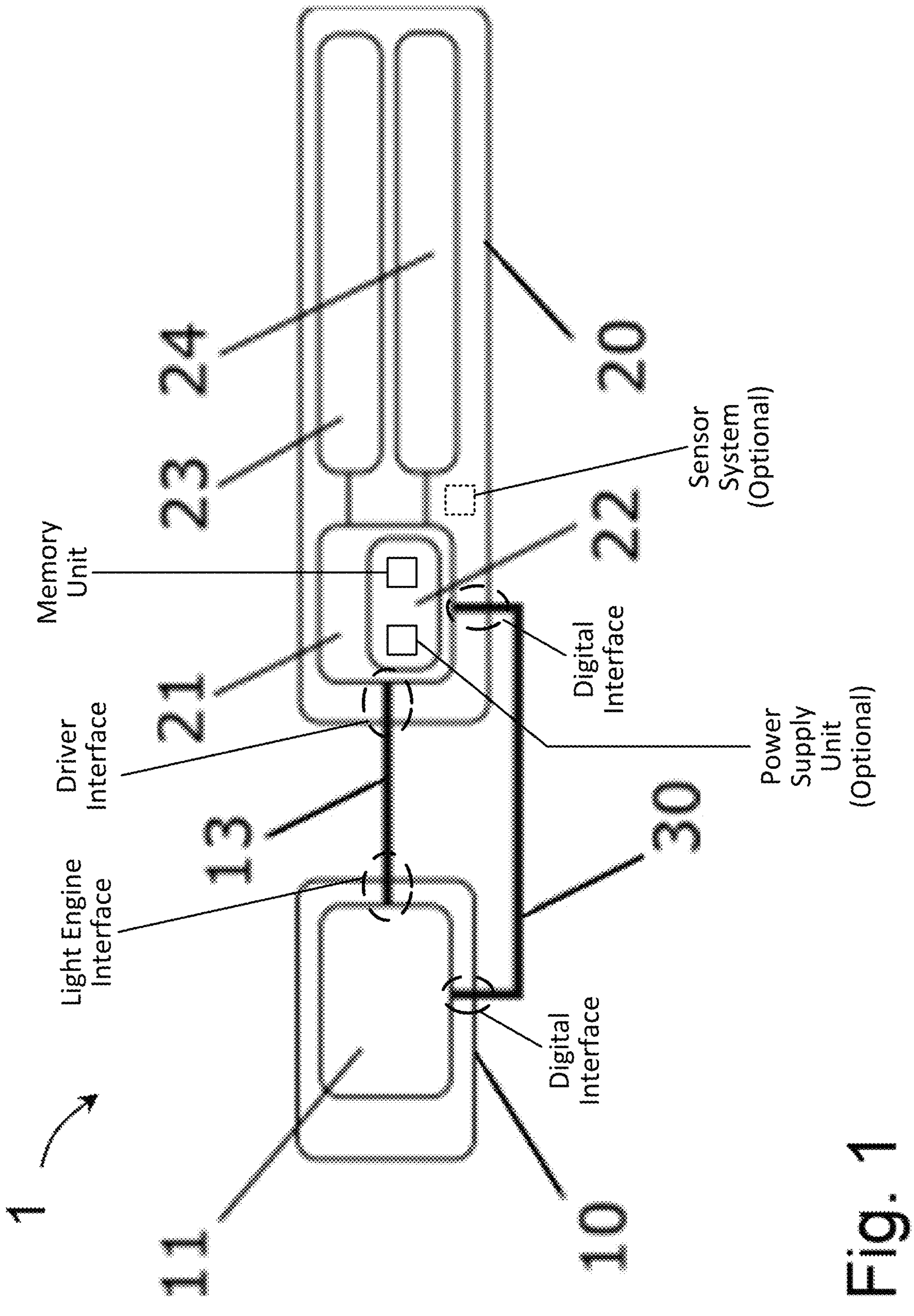
FIG. 1 shows a system according to an embodiment example.

FIG. 1 shows a system or lighting system according to an example. The system 1 of FIG. 1 comprises a driver 10 with a control unit 11 or control element for controlling an output parameter, in particular current, voltage and/or power, of the driver 10. The driver 10 has an LED interface is connected to a light engine 20 via a connection 13. The driver 10 comprises a light engine interface (not shown), which is connected to a driver interface (not shown) of the light engine 20 via the connection 13.

The light engine 20 comprises a power distribution unit 21 or power distributor, a control unit 22 or logic element and two LED strands 23 and 24. The control unit 22 comprises a memory unit (not shown) for storing operating and/or other parameters of the light engine 20. In particular, the memory unit is designed to store a maximum permissible current value of the light engine 20. The memory unit of the light engine 20 can in principle also be designed to store further information, such as the current temperature of the light engine, the LED type(s) and/or CCT (correlated colour temperature) of the light engine, operating hours, input voltage, input current, factory calibration data such as exact colour temperature and brightness of the individual LED channels, or the like.

In the embodiment example of FIG. 1, the control unit 22 is connected to the driver 10 via a communication line 30 or communication bus. The driver 10 comprises a digital interface (not shown), which is connected to a digital interface (not shown) of the light engine 20 via the communication line 30. The control unit 22 is configured to control the power distribution unit 21 so that the electrical power provided by the driver 10 can be distributed to the LED strands 23 and 24 according to the instructions of the control unit 22.

The light engine 20 may comprise a sensor system having a number of sensors for providing at least one sensor signal, and the control unit 22 may be configured to control the LED strands 23 and 24 based at least in part on the at least one sensor signal detected by the sensor system. The light engine 20 would thus be able to detect and process sensor signals to control the LED strands 23 and 24 autonomously (i.e., without inputs from the driver or from external controllers), taking into account the sensor signals, thereby simplifying the overall system.

Figure 2:
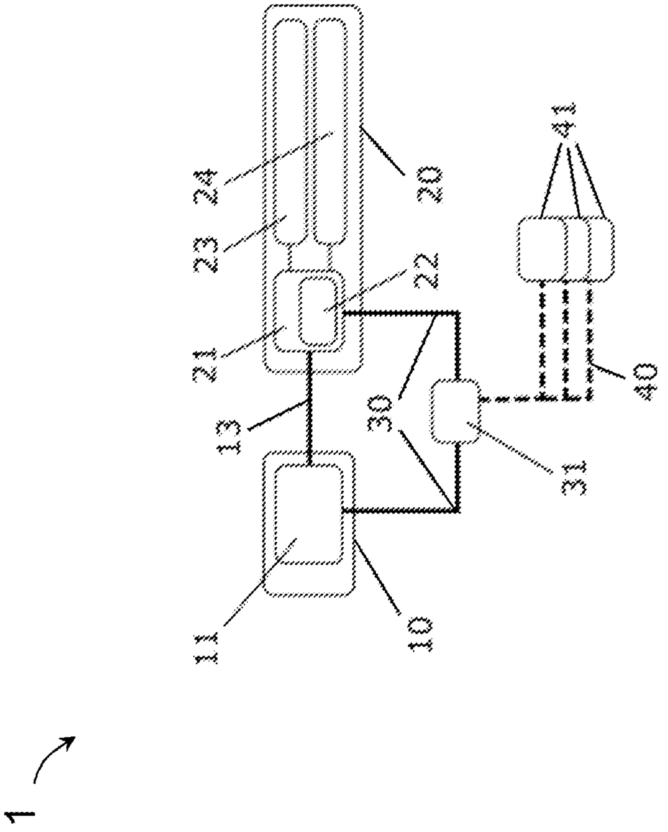
FIG. 2 shows a system according to another embodiment.

FIG. 2 shows a system according to another embodiment. The system 1 of FIG. 2 is essentially similar to the system 1 of FIG. 1 and further comprises a controller 31 or central control unit, which is connected to the communication line 30 between the digital interface of the driver 10 and the digital interface of the light engine 20. In contrast to the system 1 of FIG. 1, communication between the driver 10 and the Light Engine 20 takes place via the controller 31. FIG. 2 also shows further communication connections 40 (shown dashed) to which further system elements 41 or additional elements are connected. The further system elements 41 can in particular be designed as signal transmitters and receivers. In particular, the further system elements 41 can be designed to provide the controller 31 with further information relevant for the operation of the system 1.

In particular, the further system elements 41 or modules connected via the communication connections 40 may be in the form of sensors, user interfaces, for example in the form of switches, buttons, indicators, screens, or other forms of interaction. The system elements 41 may further comprise communication modules, in particular for communication via a standard protocol, such as ZigBee®, Bluetooth DALI®, Thread®, and/or the like.

In some embodiments, the further system elements 41 or additional elements are connected directly to the communication line 30 between the driver 10 and the light engine 20. Through the connection to the controller 31, the light engine 20 becomes part of the network or LMS and receives the information, for example, about colour temperature or spectrum from the communication line 30, 40 or communication bus and not indirectly through the currents from the driver 8. Through the connection of additional elements to the controller 31, the system can basically be expanded as desired. The controller 31, in particular with a communication bus, in particular communication line 30 or communication connection 40, thus represents a type of basic module that can be expanded into an arbitrarily complex LMS by successively connecting additional modules or system elements 41 as required.

Although the problems and solutions described here refer to constant-current drivers, parts of them are also valid for constant-voltage drivers and can be adopted accordingly for constant-voltage drivers. This applies in particular to the distribution of the power or current to the separate LED strands. The maximum current can be set in particular by means of resistors on the light engine. However, it should be noted that this determines the output voltage, analogue to the maximum current.

Although at least one exemplary embodiment has been shown in the foregoing description, various changes and modifications may be made. The aforementioned embodiments are examples only and are not intended to limit the scope, applicability or configuration of the present disclosure in any way. Rather, the foregoing description provides the person skilled in the art with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products can also be connected with each other in order to obtain further functions.

LIST OF REFERENCE SIGNS

1 system
10 driver
11 control unit
13 connection
20 light engine
21 power distribution unit
22 control unit
23 LED strand
24 LED strand
30 communication line
31 controller
40 communication connection
41 additional element

What is claimed is:

1. A light engine having a driver interface, wherein the light engine is configured to be driven by a driver via the driver interface, the light engine comprising:
a circuit comprising at least one light-emitting diode (LED) strand comprising at least one LED;
a first control unit comprising a first memory unit configured for storing a maximum allowable current value for the light engine, the maximum allowable current value corresponding to a peak electric current at which the light engine operates normally; and
a first digital interface configured for at least one of receiving data and sending data, wherein the first control unit is configured to output the maximum allowable current value stored in the first memory unit via the first digital interface for configuring the driver so that an electric current provided by the driver does not exceed the maximum allowable current value of the light engine.

2. The light engine according to claim 1, wherein:
the at least one LED strand comprises two or more LED strands; and
the light engine further comprises a power distribution unit configured for controlling a distribution of power provided by the driver to the two or more LED strands.

3. The light engine according to claim 2, wherein:
the first memory unit is further configured to store calibration data of the at least one LED; and
the first control unit is further configured to control the power distribution unit such that the distribution of power provided by the driver to the two or more LED strands is at least partially based on the calibration data.

4. The light engine according to claim 1, wherein:
the light engine further comprises a sensor system comprising at least one sensor configured for providing at least one sensor signal; and
the first control unit is configured to control the at least one LED strand at least partially based on the at least one sensor signal.

5. The light engine according to claim 4, wherein the sensor system comprises at least one of:
at least one operating sensor configured for detecting one or more current operational parameters; and
at least one environmental sensor configured for detecting one or more current environmental parameters.

6. The light engine according to claim 4, wherein:
the sensor system comprises a temperature sensor configured for detecting a current temperature of the light engine; and
the first control unit is configured to at least one of:
determine the maximum allowable current value based on the current temperature; and
update the maximum allowable current value stored in the first memory unit.

7. The light engine according to claim 1, wherein the light engine further comprises a power supply unit configured for autonomously supplying power to the first control unit.

8. The light engine according to claim 7, wherein in being configured for autonomously supplying power to the first control unit, the power supply unit is configured to supply said power without input from the driver.

9. The light engine according to claim 1, wherein:
the at least one LED comprises a plurality of LEDs of different types distributed on two or more circuit boards; and
only LEDs of one type are present on one circuit board.

10. A driver having a light engine interface, wherein the driver is configured for driving the light engine according to claim 1, the driver comprising:
a driver circuit configured for providing the electric current to drive the light engine;
a second control unit; and
a second digital interface configured for at least one of receiving data and sending data, wherein the second control unit is configured to read the maximum allowable current value for the light engine received at the second digital interface and to control the driver circuit at least partially based on the maximum allowable current value in such a way that the electric current provided by the driver does not exceed the maximum allowable current value.

11. The driver according to claim 10, wherein:
the second control unit comprises a second memory unit configured for storing the maximum allowable current value; and
the second control unit is configured to store the received maximum allowable current value in the second memory unit in order to read said value out at least one of:
at a later time; and
repeatedly until no further maximum allowable current value has been received.

12. The driver according to claim 10, wherein the second control unit is configured to control the driver circuit such that a rate of change of the electric current does not exceed a predefined value for the rate of change.

13. The light engine according to claim 1, wherein the first control unit is configured to communicate with a second control unit of the driver through the first digital interface.

14. The light engine according to claim 1, wherein the first control unit is configured to output the maximum allowable current value to the driver via the first digital interface.

15. The light engine according to claim 14, wherein the first control unit is configured to output the maximum allowable current value to a second control unit of the driver.

16. The light engine according to claim 1, wherein the first memory unit is configured to act as a communication buffer between the first digital interface and a second digital interface of the driver.

17. A system comprising:
a light engine having a driver interface, wherein the light engine is configured to be driven by a driver via the driver interface, the light engine comprising:
a circuit comprising at least one light-emitting diode (LED) strand comprising at least one LED;
a first control unit comprising a first memory unit configured for storing a maximum allowable current value for the light engine, the maximum allowable current value corresponding to a peak electric current at which the light engine operates normally; and a first digital interface configured for at least one of receiving data and sending data, wherein the first control unit is configured to output the maximum allowable current value stored in the first memory unit via the first digital interface for configuring the driver so that an electric current provided by the driver does not exceed the maximum allowable current value of the light engine; and the driver having a light engine interface, wherein the driver is configured for driving the light engine, the driver comprising:

a driver circuit configured for providing the electric current to drive the light engine;

a second control unit; and a second digital interface configured for at least one of receiving data and sending data, wherein the second control unit is configured to read the maximum allowable current value for the light engine received at the second digital interface and to control the driver circuit at least partially based on the maximum allowable current value in such a way that the electric current provided by the driver does not exceed the maximum allowable current value;

wherein:

the driver interface of the light engine is electrically connected to the light engine interface of the driver; and a communication pathway is provided between the first digital interface of the light engine and the second digital interface of the driver.

18. The system according to claim 17, wherein the system further comprises a controller configured to be in communication with the first digital interface of the light engine and the second digital interface of the driver.

19. The system according to claim 18, wherein the system further comprises at least one further system element configured to be in communication with the controller.

20. The system according to claim 19, wherein the at least one further system element comprises at least one of:

one or more interface elements; and one or more communication modules.

* * * * *